April 21, 1970     A. FRANKS     3,507,564
METHOD OF MAKING A THREE-DIMENSIONAL DIFFRACTION GRATING
Filed Nov. 15, 1965
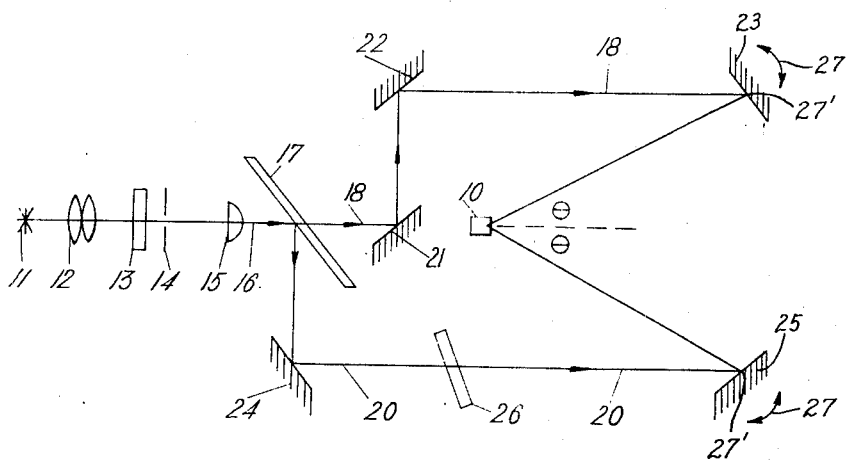

United States Patent Office 3,507,564
Patented Apr. 21, 1970

3,507,564
METHOD OF MAKING A THREE-DIMENSIONAL DIFFRACTION GRATING
Albert Franks, Teddington, England, assignor to National Research Development Corporation, London, England, a corporation of Great Britain
Filed Nov. 15, 1965, Ser. No. 512,837
Claims priority, application Great Britain, Nov. 19, 1964, 47,256/64
Int. Cl. G02b 5/18
U.S. Cl. 350—320                          6 Claims

ABSTRACT OF THE DISCLOSURE

A method of producing a three-dimensional diffraction grating comprises forming three sets of planar, mutually inclined interference fringes within a block of photochemical material such that the three sets of fringes intersect at points which form a space lattice. The block is then processed to "fix" the photochemical reaction which has occurred within it, thereby forming a space lattice of points of different light-transmitting properties compared with the remainder of the block.

---

This invention concerns a method of producing a three dimensional diffraction grating and a three dimensional diffraction grating when so made.

According to the present invention a method of producing a three dimensional diffraction grating comprises forming three sets of substantially planar light interference fringes within a block of photo-chemical material such that the planes of all three sets of fringes are inclined relative to one another and the three sets of fringes intersect at points which form a space lattice, and processing said block of material such that the light transmitting properties of said points differ from those of the remainder of the block.

Preferably the points are more opaque than the remainder of the block of material.

The spacing of the fringes of one set of fringes may be different from that of the other sets of fringes. Thus the spacings of the fringes of all three sets may be different such that the spacings of the planes of the three principles sets of planes through the grating lattice so formed may be different.

In one method, the sets of interference fringes are mtually perpendicular while in others the sets of interference fringes all lie at different angles to one another.

The sets of interference fringes are more easily formed consecutively. However, they may be formed simultaneously.

The invention also includes a three dimensional diffraction grating formed by the method set forth above.

The invention is illustrated, merely by way of example, in the accompanying drawing which shows apparatus for forming a three dimensional diffraction grating according to the present invention.

Referring to the drawing there is shown an interferometer for producing interference fringes in a block 10 of photo-chemical material. The interferometer includes a mercury lamp 11, a condenser 12, a filter 13, a pinhole screen 14 and a collimator 15. Light from lamp 11 passes through these components such that a collimated beam 16 of substantially monochromatic light is directed onto an inclined dividing plate 17. The incident beam 16 is split into a transmitted beam 18 and a reflected beam 20. Beam 18 is reflected by plane mirrors 21, 22, 23 and directed into the block 10. Beam 20 is reflected by plane mirrors 24, 25 transmitted by a compensating plate 26 and directed into block 10. The beams 18 and 20 interfere within block 10 to form a set of interference fringes. The spacing of the fringes in this set may be varied by changing the angle θ by rotating mirrors 23 and 25 in the directions shown by the arrows 27 about axes 27′ (see drawing).

When the block 10 has been exposed to the interference fringes, it is turned through 90°, the mirrors 23 and 25 are repositioned and the block is exposed to a different set of interference fringes in a plane at 90° to the first set. When the block has been exposed to this second set of fringes, the block is turned through 90° about an axis which is perpendicular to that about which the first angular rotation was made, mirrors 23 and 25 are repositioned and block 10 is exposed to a third set of interference fringes.

The block 10, after its three exposures, is developed to "fix" the photo-chemical reaction which has occurred within the block. A space lattice of points which are more opaque than the remainder of the block is formed, these points being those formed at the points of intersection of all three sets of interference fringes.

The three dimensional diffraction grating so formed has the individual planes in the three principal sets of planes of the grating spaced by different amounts. Thus the grating has wider application than those with equi-spaced planes.

The photo-chemical material used may, for example, comprise glass which has been rendered photosensitive by the presence of a silver compound together with a sensitiser, as manufactured by Corning Glass Works Inc.

It will be appreciated that many variations may be effected to the method outlined above to provide different gratings. Thus the block 10 need not be turned through 90° at each stage, and the three exposure positions need not be mutually perpendicular. Any three relatively inclined positions will provide a space lattice and may thus be used, the selection of angles between the planes of interference fringes being dictated by the type of space lattice required in the grating.

Also, the spacings of individual fringes in the sets need not be different. The same position of mirrors 23 and 25 may be used for two or all three exposures, the application of the grating being reduced in each case.

Again, the three sets of interference fringes need not be projected consecutively, as described, but could be projected simultaneously.

It will be appreciated that not only visible light, but any actinic radiation, such as ultra-violet light, may be used to produce the required interference fringes word "light" as used herein should be construed accordingly.

If desired, the exposed block 10 could be further treated to convert the points of relative opacity into points of refractive index different from that of the remainder of the block.

The processing of block 10 may be such as to alter the light reflecting properties of the points instead of the light transmitting properties, if a reflecting grating is required.

I claim:
1. A method of producing a three dimensional diffraction grating comprising the steps of: providing a block of photochemical material; forming three sets of light interference fringes within the block of photo-chemical material, each set comprising a plurality of substantially parallel planes of interference fringes, the planes of each of the three sets of fringes being inclined relative to the other two sets, and the three sets of fringes intersecting each other at a plurality of points which form a regular three dimensional array of points, and processing said block of material such that the light transmitting or reflecting properties of said points differ from those of the remainder of the block.

2. A method as claimed in claim 1 wherein the sets of interference fringes are mutually perpendicular.

3. A method as claimed in claim 1 wherein the sets of interference fringes are formed consecutively.

4. A method as claimed in claim 1 wherein the step of processing comprises making the points more opaque than the remainder of the block of material.

5. A method as claimed in claim 1 wherein the forming step comprises spacing the fringes of the planes of one of said sets of fringes, a different amount from the spacing between the planes of the other sets of fringes.

6. A method as claimed in claim 5 wherein the forming step comprises spacing the planes of the fringes of each set differently from the spacing of the planes of each other set.

References Cited

UNITED STATES PATENTS 1,354,471  10/920  Doner _____ 350—162 X

OTHER REFERENCES

Mollet: "Optics in Metrology," published by Pergamon Press, 960, pages 361–368 relied on.

Burch et al.: "Interferometric methods for the photographic production of large grating," Optica Acta, vol. 8, No. 1, January 1961, pages 73–80.

Denisyuk: "On the Reproduction of the Optical Properties of an Object by the Wave Field of its Scattered Radiation," Optics and Spectroscopy, vol. 15, No. 4, October 1963, pp. 279–284.

JOHN K. CORBIN, Primary Examiner

U.S. Cl. X.R.

356—106; 96—40; 350—162